US010483601B2

(12) United States Patent
Murata et al.

(10) Patent No.: US 10,483,601 B2
(45) Date of Patent: Nov. 19, 2019

(54) BATTERY PACK WITH ENCLOSED HEATER

(71) Applicant: Toyota Jidosha Kabushiki Kaisha, Toyota-shi, Aichi-ken (JP)

(72) Inventors: Takashi Murata, Kasugai (JP); Masaki Hanada, Toyota (JP)

(73) Assignee: Toyota Jidosha Kabushiki Kaisha, Toyota-shi, Aichi-ken (JP)

( * ) Notice: Subject to any disclaimer, the term of this patent is extended or adjusted under 35 U.S.C. 154(b) by 68 days.

(21) Appl. No.: 15/634,682

(22) Filed: Jun. 27, 2017

(65) Prior Publication Data

US 2018/0006345 A1 Jan. 4, 2018

(30) Foreign Application Priority Data

Jun. 30, 2016 (JP) ................................ 2016-130294

(51) Int. Cl.
  *H01M 10/615* (2014.01)
  *H01M 10/6571* (2014.01)
  *H01M 2/10* (2006.01)
  *H01M 10/625* (2014.01)

(52) U.S. Cl.
  CPC ....... *H01M 10/615* (2015.04); *H01M 2/1077* (2013.01); *H01M 10/625* (2015.04); *H01M 10/6571* (2015.04); *H01M 2220/20* (2013.01)

(58) Field of Classification Search
  CPC ............. H01M 10/615; H01M 2/1077; H01M 10/625; H01M 10/6571; H01M 2220/20
  See application file for complete search history.

(56) References Cited

U.S. PATENT DOCUMENTS

| 2008/0096072 | A1 | 4/2008 | Fukusako et al. | |
|---|---|---|---|---|
| 2008/0198897 | A1 | 8/2008 | Suzuki et al. | |
| 2011/0300421 | A1 | 12/2011 | Iritani et al. | |
| 2012/0021260 | A1* | 1/2012 | Yasui | F28D 15/0275 429/53 |
| 2015/0244035 | A1* | 8/2015 | Yokoyama | H01M 2/1077 429/71 |

FOREIGN PATENT DOCUMENTS

| CN | 2588553 Y | 11/2003 |
|---|---|---|
| CN | 204333165 U | 5/2015 |
| CN | 104868071 A | 8/2015 |
| CN | 205069814 U | 3/2016 |
| JP | 2008-053149 A | 3/2008 |
| JP | 2008-204708 A | 9/2008 |
| JP | 2011-076779 A | 4/2011 |

(Continued)

*Primary Examiner* — Stephan J Essex
*Assistant Examiner* — Kwang Han
(74) *Attorney, Agent, or Firm* — Dinsmore & Shohl LLP

(57) ABSTRACT

A battery pack includes a cell stack including a plurality of battery cells arrayed in one direction, a housing case housing the cell stack, and a heater configured to increase temperature of the battery cells. The heater is arranged on top of a bottom part of the housing case inside the housing case such that the heater is separated from a cell bottom part of the battery cell vertically downwardly, and a space between the bottom part of the housing case and the cell bottom part of the battery cell is a closed space in a section in a direction orthogonal to an array direction of the plurality of battery cells.

3 Claims, 5 Drawing Sheets

(56) References Cited

FOREIGN PATENT DOCUMENTS

| JP | 2012-015096 A | 1/2012 |
| JP | 2012-195187 A | 10/2012 |
| JP | 2014-089822 A | 5/2014 |
| JP | 2014-183013 A | 9/2014 |
| JP | 2015-158978 A | 9/2015 |

\* cited by examiner

BATTERY PACK WITH ENCLOSED HEATER

CROSS-REFERENCE TO RELATED APPLICATIONS

This application claims priority to Japanese Patent Application No. 2016-130294 filed on Jun. 30, 2016 which is incorporated herein by reference in its entirety including the specification, drawings and abstract.

BACKGROUND

1. Technical Field

The disclosure relates to a battery pack, particularly to a temperature raising structure for a cell stack.

2. Description of Related Art

A battery pack structure with a heater has been disclosed, for example, the one disclosed in Japanese Patent Application Publication No. 2008-53149 (JP 2008-53149 A) explained below. This battery pack structure with a heater is provided with a battery pack made by arraying a plurality of secondary batteries, a metallic housing case in which the battery pack is housed, and a heater for increasing temperature of the battery pack. The battery pack inside the housing case is housed in a state where a space is formed between the battery pack and a case bottom part. To be in more detail, a lower case part of the housing case has a recessed part having a shape of a rectangular recess, and a rib part having a rectangular annular shape located on an opening end side of the recessed part. The battery pack is housed while being supported on top of the rib part of the lower case part. Because of this, below each of the secondary batteries that structure the battery pack, there is a space that is formed inside the recessed part formed in the lower case part.

The heater for increasing temperature of the battery pack is arranged to be in contact with an outer surface of the recessed part of the lower case part. The heater is housed in a holding member formed into a rectangular recess. The holding member is attached to the lower case part by a plurality of screws that are inserted in insertion holes formed in a rib part of the holding member.

SUMMARY

In the battery pack structure with a heater in JP 2008-53149 A, which is structured as described above, air in the space inside the recessed part of the metallic lower case part is heated by operating the heater, and the heated air heats each of the secondary batteries that structures the battery pack and increases its temperature.

However, in this configuration, since the heater is attached to the outer surface of the recessed part of the lower case part, heat generated by operation of the heater is first transferred to the metallic lower case part, and then air in the space inside the recessed part is heated through the metallic lower case part. Heat transferred from the heater to the lower case part is radiated around the battery pack structure from the outer surface of the lower case part other than a heater installing part, and heat is also transferred to an upper case part that structures the housing case. Therefore, there is a problem that the heater has low temperature increasing efficiency for the battery pack.

Thus, the disclosure provides a battery pack that is able to efficiently increase temperature of each battery cell included in a cell stack by using a heater provided inside a housing case.

A battery pack according to an aspect of the disclosure includes a cell stack including a plurality of battery cells arrayed in one direction, a housing case housing the cell stack, and a heater configured to increase temperature of the battery cells. The heater is arranged on top of a bottom part of the housing case inside the housing case such that the heater is separated from a cell bottom part of the battery cell vertically downwardly, and a space between the bottom part of the housing case and the cell bottom part of the battery cell is a closed space in a section in a direction orthogonal to an array direction of the plurality of battery cells.

In the battery pack according to the aspect of the disclosure, since the heater is arranged inside the housing case so as to be vertically downwardly separated from the cell bottom part of the battery cell that structures the cell stack, air heated by the heater ascends and comes into contact with the cell bottom part. Because of this, temperature of the battery cell increases. Also, a space formed between the heater and the cell bottom part of the battery cell is formed as a closed space in a section in a direction orthogonal to an array direction of the battery cells. Therefore, convection of air heated by the heater is possible within the section, without the air leaking outside the case. Because of these, it is possible to use heat generated by the heater effectively in order to increase temperature of each of the battery cells, and it is possible to increase temperature of each of the battery cells efficiently.

The foregoing aspect may be the following configuration. A recessed heater installing part is provided in the bottom part of the housing case, in the section in the direction orthogonal to the array direction of the battery cells, stack support parts on both sides of the recessed heater installing part support the cell stack in a state of being in contact with the cell bottom part of the battery cell such that the closed space is defined, and an elastic body is interposed in a contact part between the stack support part and the cell bottom part.

In this configuration, since the elastic body is interposed in the contact part between the stack support part supporting the cell stack and the cell bottom part of the battery cell, it is possible to ensure that no gap is made between the stack support part and the cell bottom part. Therefore, it is possible to further ensure that air heated by the heater is restrained from leaking from the foregoing space. As a result, temperature increasing efficiency for the battery cell is improved more.

The foregoing aspect may be the following configuration. The heater is arranged on top of the bottom part of the housing case through a thermal insulation member such that the heater is not to be in contact with the housing case.

In this configuration, since the heater is arranged on top of the case bottom part through heat insulation means such that the heater is not to be in contact with the housing case, it is possible to restrain heat transfer from the heater to the housing case.

In this case, the thermal insulation member may be an insulating resin sheet including a projection configured to define an air layer.

In this configuration, since the heat insulation means is the insulating resin sheet including the projection configured to define the air layer, it is possible to thermally and electrically insulate the heater and the case bottom part from each other.

In the battery pack according to the disclosure, the heater provided inside the housing case is able to efficiently increase temperature of each of the battery cells that structures the cell stack.

BRIEF DESCRIPTION OF THE DRAWINGS

Features, advantages, and technical and industrial significance of exemplary embodiments of the disclosure will be described below with reference to the accompanying drawings, in which like numerals denote like elements, and wherein.

DETAILED DESCRIPTION OF EMBODIMENTS

Herein below, an embodiment of the disclosure is explained in detail with reference to the attached drawings. In the explanation, specific shapes, materials, numerical values, directions and so on are just examples in order to facilitate understanding of the disclosure, and may be changed as appropriate depending on usages, purposes, specifications, and so on. Herein below, in the case where more than one embodiments and modifications, etc. are included, it is originally assumed that configurations of those embodiments and modifications, etc. are used as an appropriate combination.

Figure 1:
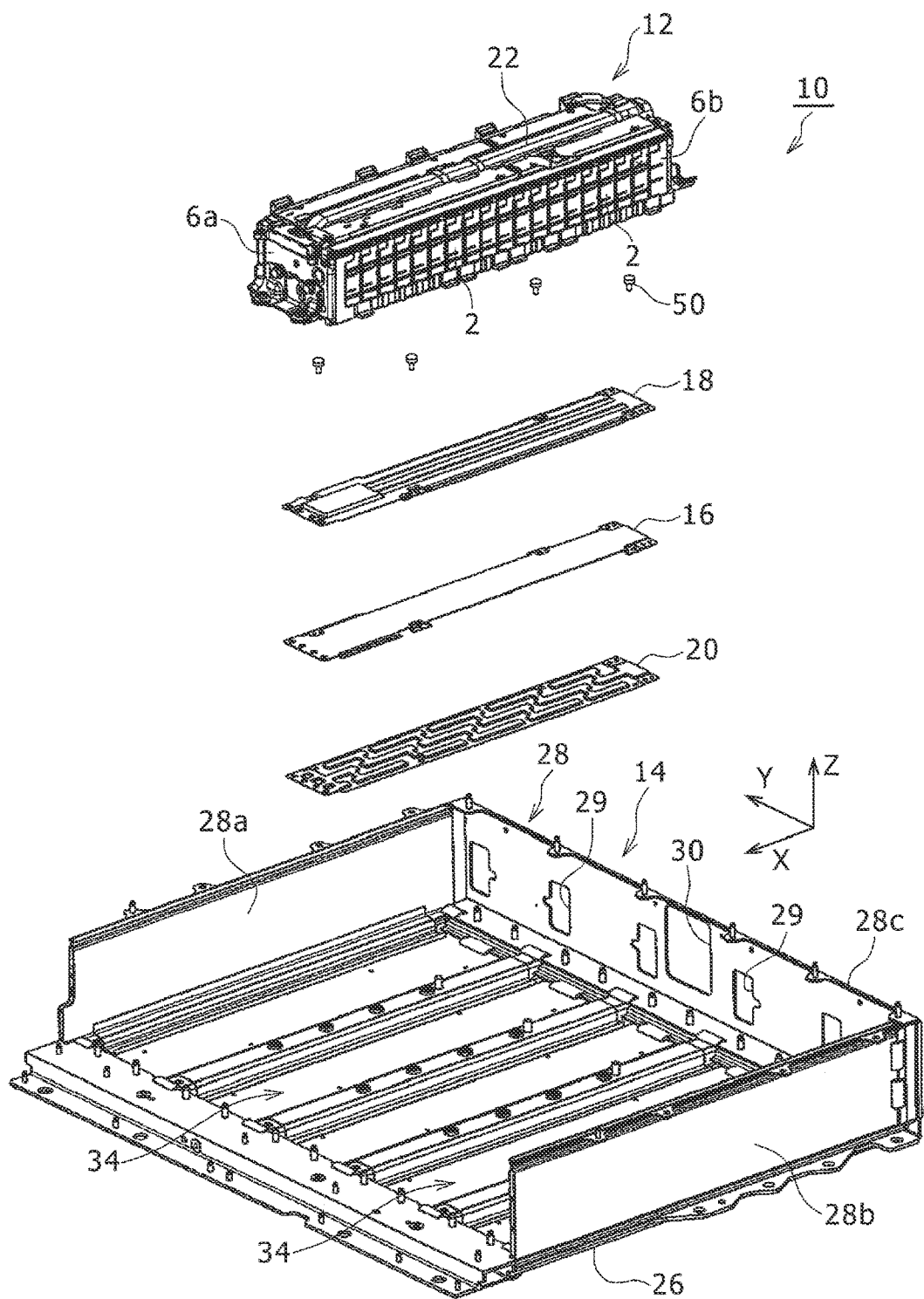
FIG. 1 is an exploded perspective view of a battery pack that is an embodiment of the disclosure.
Figure 2:
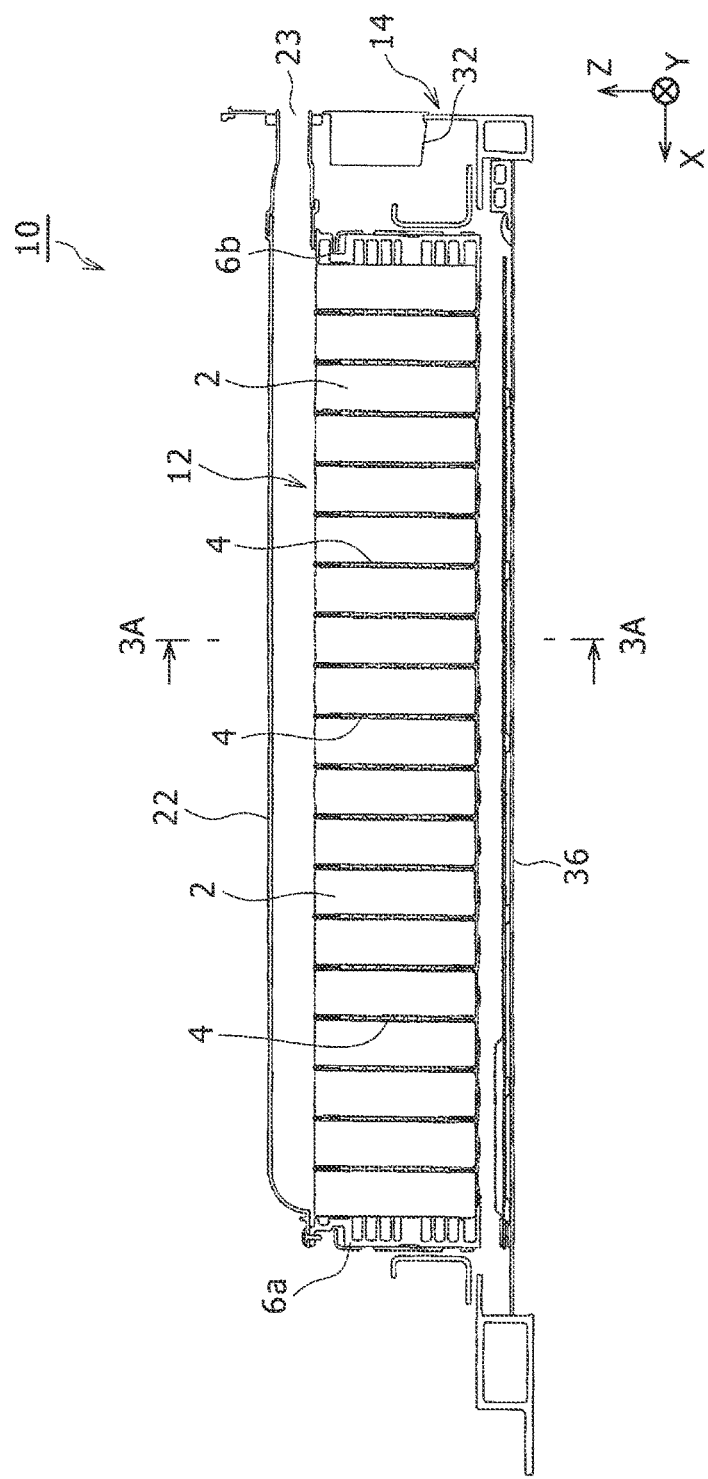
FIG. 2 is a sectional view of the battery pack taken along an array direction of a cell stack shown in FIG. 1.
Figure 3:
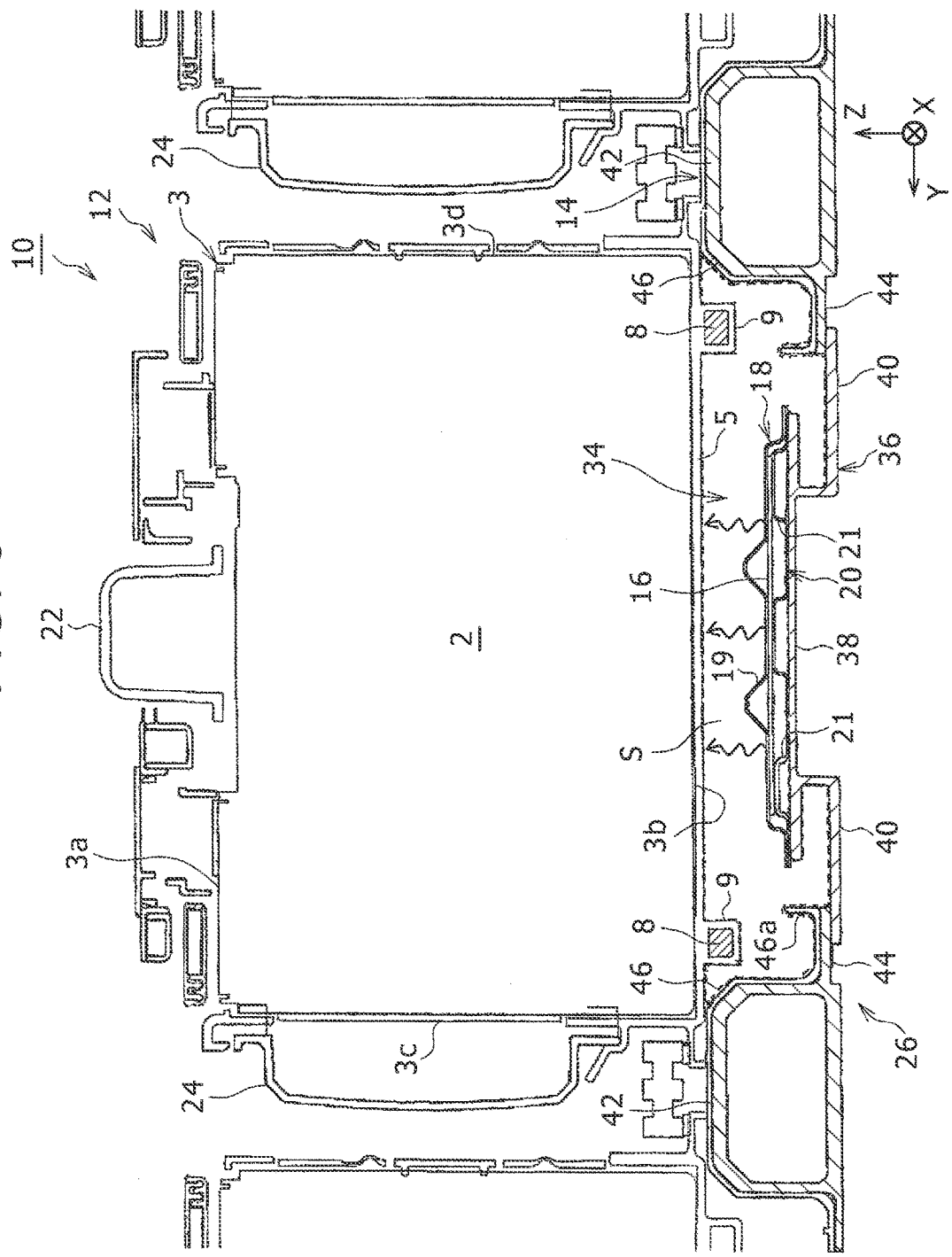
FIG. 3 is an enlarged sectional view taken along the line 3A-3A in FIG. 2.

FIG. 1 is an exploded perspective view of a battery pack 10 that is an embodiment of the disclosure. FIG. 2 is a sectional view of the battery pack taken along an array direction of a cell stack shown in FIG. 1. FIG. 3 is an enlarged sectional view taken along the line 3A-3A in FIG. 2. FIG. 1 shows three directions X, Y, Z that are orthogonal to each other. Herein below, the X direction is sometimes referred to as a length direction (or an array direction), the Y direction is sometimes referred to as a width direction, and the Z direction is sometimes referred to as a height direction. This applies to the rest of FIG. 2 to FIG. 5 as well.

As shown in FIG. 1, the battery pack 10 is provided with a cell stack 12, a housing case 14, and a heater 16. The battery pack 10 according to the embodiment has a form in which, for example, five cell stacks 12 are housed in the housing case 14, but FIG. 1 shows only one of the cell stacks 12. The heater 16 is arranged in a case bottom part of the housing case 14 in a state of being sandwiched between a cover member 18 and a base member 20 from above and below, respectively, which is described later.

The cell stack 12 is a battery pack that is made by arraying a plurality of battery cells 2 in one direction. In the embodiment, as shown in FIG. 2, a form is shown as an example in which nineteen battery cells 2 are arranged along the length direction X. The battery cell 2 is a secondary battery serving as the smallest unit that structures the battery pack 10, and may be, for example, a flat rectangular lithium ion battery. However, the battery cell 2 may be other secondary battery such as a nickel-hydrogen battery. In the cell stack 12, the battery cells 2 are connected with each other in series, parallel, or a combination of series and parallel through a bus bar (now shown).

As shown in FIG. 2, each of a plurality of spacers 4 is interposed between the battery cells 2, respectively, that structure the cell stack 12. Because of each of the spacers 4, a gap serving as a refrigerant flow passage is formed between each of the battery cells 2. These refrigerant passages are made of the plurality of gaps extending in parallel along the width direction of the battery cell 2. Further, as shown in FIG. 3, an air supply duct 24 is attached to one side surface of the cell stack 12 in the width direction Y. Once air is supplied by a fan (not shown) and so on as refrigerant through the air supply duct 24, the air flows along the refrigerant passage between the battery cells 2 along the width direction Y while being in contact with an outer surface of a battery case 3. Thus, it is possible to cool the battery cells 2 whose temperature becomes high due to chemical reactions inside the cells when charging and discharging, an external environment temperature, and so on.

As shown in FIG. 1 and FIG. 2, a pair of end plates 6a, 6b is arranged on both ends of the cell stack 12 in an array direction X, respectively. Both end parts of a plurality of binding bands 8 are connected with the end plates 6a, 6b, respectively, and the binding bands 8 are bridged over the battery cells 2 with given tension. Although FIG. 3 shows two binding bands 8 arranged in a lower part of the battery cell 2, for example, two binding bands are also arranged in an upper part of the battery cell 2. The pair of end plates 6a, 6b connected with each other by the binding bands 8 presses each of the battery cells 2 included in the cell stack 12 from both sides in the array direction X. As a result, a binding load is applied to the battery cells 2 through the spacers 4.

As shown in FIG. 2 and FIG. 3, the battery cell 2 is structured by enclosing an electrode group and nonaqueous electrolyte inside the flat rectangular battery case 3 that is made from, for example, metal. The electrode group is made by winding or layering a positive electrode, a negative electrode and a separator. For example, the battery case 3 is made of a metallic plate that is made from an aluminum alloy and so on. In an upper surface 3a of the battery case 3, a positive electrode terminal and a negative electrode terminal (not shown) are provided. As a bus bar is connected with the positive electrode terminal and the negative electrode terminal, the battery cells 2 are electrically connected with each other.

Further, a safety valve (not shown) is provided in a center part of the upper surface 3a of the battery case 3 in the width direction Y. The safety valve is a safety mechanism that opens when temperature inside of the battery cell 2 becomes high with some cause and internal pressure reaches a given value or higher, so that high temperature gas inside is jet out.

An exhaust duct 22 is installed in an upper part of the cell stack 12. As shown in FIG. 3, the exhaust duct 22 has an inverted U-shaped section and extends along the array direction X of battery cells 2. The exhaust duct 22 is arranged at a position facing the safety valve provided in an upper surface of each of the battery cells 2. As shown in FIG. 2, one end part of the exhaust duct 22 in the array direction X is fixed to the end plate 6a in a closed state. Meanwhile, the other end part of the exhaust duct 22 in the array direction X is open, forming an exhaust port 23. Because of this, when the safety valve of any one of the battery cells 2 that structure the cell stack 12 operates and high temperature gas is jet out, the gas is discharged outside of the battery pack 10 from the exhaust port 23 through the exhaust duct 22.

As shown in FIG. 3, a resin frame 5 covers at least a bottom surface 3b and both side surfaces 3c, 3d in the width direction Y out of outer surfaces of the battery case 3 of the battery cell 2. The resin frame 5 is composed of a molded part of insulating resin such as polypropylene, for example. The resin frame 5 is mounted on the battery cell 2 by fitting a pair of the resin frame pieces from both sides of the battery case 3 in the array direction X. In this state, the bottom surface 3b of the battery cell 2 is covered by the resin frame 5 to be in contact with the resin frame 5. The resin frame 5 may be provided so as to cover the upper surface of the battery case 3.

As stated above, in the embodiment, in each of the battery cells 2 that structures the cell stack 12, the bottom surface 3b and both side surfaces 3c, 3d in the width direction Y are covered by the resin frame 5 and thus not exposed. This improves safety of an operator who performs assembly, replacement or the like of the cell stack 12. In the battery pack 10 according to the embodiment, the resin frame 5 covering the bottom surface of the battery cell 2 corresponds to the cell bottom part.

In the embodiment, the resin frame 5 has two band insertion parts 9 that form a generally rectangular shape and project downwardly. Band housing holes are formed as rectangular holes of the band insertion parts 9 of the resin frame 5 mounted on each of the battery cells 2 are aligned with each other in the array direction X. The two binding bands 8 arranged in the lower part of the cell stack 12 are inserted in the band housing holes that are made by the continuous band insertion parts 9.

With reference to FIG. 1 again, the housing case 14 is, for example, a metallic case made from an aluminum alloy or the like. The housing case 14 includes a case bottom part 26 and a side wall 28. The case bottom part 26 is formed into a generally oblong shape when viewed from above. The side wall 28 includes a pair of side wall parts 28a, 28b, which rise up from both side edge parts of the case bottom part 26 in the width direction Y, respectively, and a side wall part 28c, which rises up from one side edge part of the case bottom part 26 in the length direction X. The side wall parts 28a, 28b, 28c are structured integrally with the case bottom part 26.

Five openings 29 are formed in the side wall part 28c that is orthogonal to the length direction X and included in the side wall 28 of the housing case 14. The five openings 29 are formed corresponding to the five cell stacks 12 housed inside the housing case 14. Each of the openings 29 communicates with one end part in the length direction X of the air supply duct 24 (see FIG. 3) of each of the cell stacks 12 housed inside the housing case 14. Thus, it is possible to take in air into the housing case 14 from outside the battery pack 10.

A generally square-shaped opening 30 is formed in a center part in the width direction of the side wall part 28c of the housing case 14. As shown in FIG. 2, an electric power connector 32 is attached to the opening 30. The electric power connector 32 is connected with each of the cell stacks 12 housed inside the housing case 14 through a power cable (not shown). Charging and discharging of electric power for the battery pack 10 can be carried out through the electric power connector 32.

The case bottom part 26 and the side wall 28 of the housing case 14 define an internal space having a flat rectangular parallelepiped shape. The cell stacks 12 are housed in the internal space. In the embodiment, an example is shown in which the five cell stacks 12 are housed in five rows, but the number of the cell stacks is not limited to this. The number of the cell stacks 12 included in the battery pack 10 may be four or less, or six or more.

As shown in FIG. 1, the internal space of the housing case 14 is open upwardly and is also open on the other side in the length direction X. These openings are closed by a lid member (not shown) that has a L-shape in a side view from the width direction Y.

In the case bottom part 26 of the housing case 14, the five heater installing parts 34 having a recessed shape are formed corresponding to the cell stacks 12, respectively. The heater installing parts 34 have an oblong shape that is elongated in the array direction X in a view from above, and are provided in parallel to one another. Since the heater installing parts 34 have the same configuration, one of the heater installing parts 34 is described below in detail with reference to FIG. 3.

As shown in FIG. 3, the heater installing part 34 includes a heater installing member 36 arranged vertically below the cell stack 12. The heater installing member 36 structures a part of the case bottom part 26 of the housing case 14. The heater installing member 36 includes a base part 38 on which the heater 16 is installed, and two bottom plate parts 40 having an L-shape sectional shape and extending from a lower surface of the base part 38 on both sides in the width direction Y, respectively. The heater 16 is installed on the base part 38 in a state of being sandwiched between the cover member 18 and the base member 20 from above and bottom, respectively. This means that the heater 16 is arranged inside the housing case 14.

The bottom plate parts 40 of the heater installing member 36 are fixed to lower surfaces of projecting parts 44 on both sides in the width direction Y, respectively, by, for example, welding or the like. The projecting parts 44 project from side surfaces of the stack support parts 42 in the width direction Y, respectively. In some embodiments, the bottom plate parts 40 of the heater installing member 36 and the projecting parts 44 of the stack support parts 42 are connected with each other in an airtight state. This is because, as stated later, air that is heated by the heater 16 inside the recessed-shaped heater installing part 34 does not escape to outside from the case bottom part 26.

The stack support parts 42 that are present on both sides of the heater installing part 34 with respect to the width direction Y structure a part of the case bottom part 26 of the housing case 14. In the embodiment, the stack support parts 42 are made of metallic hollow angular pipes, and the upper surfaces of the stack support parts 42 are located higher than the base part 38 of the heater installing member 36. The stack support parts 42 are in contact with the resin frame 5 that structures the cell bottom part of the battery cell 2 included in the cell stack 12, and has a function of supporting the cell stack 12. Herein below, the resin frame 5 is referred to as the cell bottom part 5 as necessary.

A position of the base part 38 of the heater installing member 36 is set to be lower than the position of the upper surfaces of the stack support parts 42. Thus, the heater 16 installed on the base part 38 is arranged so as to be separated from the cell bottom part 5 of the battery cell 2 vertically downwardly, and a space S is formed between the cell bottom part of the battery cell 2 and the heater 16. In the space S, no member such as a wall is present. Further, the space S is formed as a closed space in a section in a direction orthogonal to the array direction X and is made of the cell bottom part 5, and the heater installing member 36 and the stack support parts 42 that structure the case bottom part 26. In FIG. 3, an outline of an external shape of the closed space is shown by a broken line. Since the space S inside the heater installing part 34 having a recessed shape is made as the closed space, air heated by the heater 16 does not leak out from the heater installing part 34, and the heater 16 is able to increase temperature of the battery cell 2 efficiently.

In an end part of the battery pack 10 in the length direction X, an opening may be formed in the side wall 28 of the housing case 14 in order to draw out a wire harness or the like for extracting electric signals, which extends from the cell stack 12. Therefore, the pace S may communicate with outside of the battery pack 10.

An elastic body 46 is provided in a contacted part between the stack support part 42 and the cell bottom part 5. In the embodiment, the elastic body 46 is made from, for example, rubber or the like. By providing the elastic body 46 in this way, it is possible to ensure that no gap is made between the stack support part 42 and the cell bottom part 5, and to specifically ensure that leakage of heated air is prevented. In the embodiment, the elastic body 46 is provided so as to cover an upper surface and side surfaces of the stack support part 42 and an upper surface of the projecting part 44.

In some embodiments, the elastic body 46 is made from an insulating material such as rubber, for example. Therefore, the elastic body 46 is able to further enhance electrical insulation between the cell stack 12 and the case bottom part 26, in addition to the resin frame 5 made from an insulating resin material.

As described above, the heater 16 is installed on the base part 38 of the heater installing member 36 in a state of being sandwiched between the cover member 18 and the base member 20 from above and bottom, respectively. As shown by a broken line in FIG. 4, the heater 16 in the embodiment is a film heater having an oblong shape that is elongated in the array direction X. The heater 16 is installed on the base part 38 through the base member 20 serving as heat insulation means so that the heater 16 is not in contact with the heater installing member 36 that structures the case bottom part 26 of the housing case 14.

In the embodiment, the base member 20 is formed of an insulating resin sheet in order to electrically insulate the heater 16 from the metallic heater installing member 36. As a specific example, the base member 20 is made of a polycarbonate sheet material (with a thickness of 0.5 mm). Since the base member 20 is arranged in contact with the heater 16, the base member 20 may be made from a resin material having high heat resistance (or a melting point higher than heating temperature of the heater 16), and polycarbonate is also suitable in this regard.

Further, the base member 20 functions as heat insulation means that restrains heat transfer from the heater 16 to the heater installing member 36. Therefore, a plurality of projections 21 having, for example, a trapezoid sectional shape, are formed in the base member 20, and structured so that an air layer is formed between the heater 16 and the base part 38. In the embodiment, an example is shown in which three projections 21 are formed in a section in the width direction Y. Because the heater 16 is supported on the projections 21 formed as above, the heater 16 is raised from the base part 38 of the heater installing member 36, and it is thus possible to effectively insulate heat between the heater 16 and the heater installing member 36 through the air layer formed by the base member 20.

The number and shape of the projections 21 formed in the base member 20 may be changed in any way as long as an air layer is formed between the heater 16 and the base part 38 of the heater installing member 36. The base member 20 may be made of a thermal insulation member that does not include an air layer (for example, a flat resin sheet in which no projection is formed).

The top of the heater 16 is covered by the cover member 18. The cover member 18 is provided to be in contact with an upper surface of the heater 16. The cover member 18 covers the heater 16 and thus has a function of protecting the heater 16. The cover member 18 is made of, for example, a resin sheet. To be more specific, the cover member 18 is made from a polycarbonate sheet material. Since the cover member 18 is provided to be in contact with the heater 16, the cover member 18 may have insulation properties and high heat resistance like the base member 20. Therefore, for example, polycarbonate is used suitably as its material.

Figure 4:
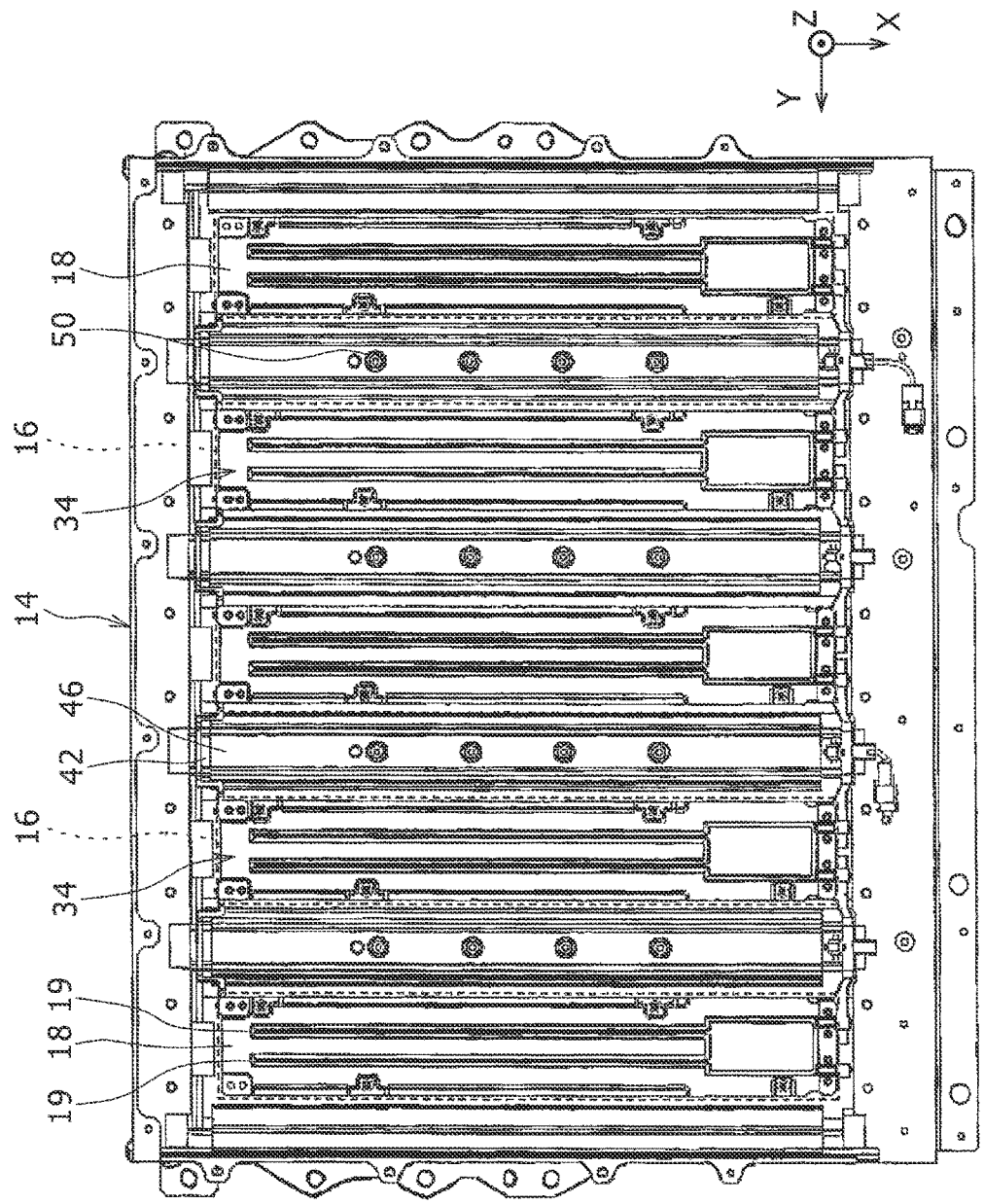
FIG. 4 is a plan view of a housing case in which a heater is installed, the housing case seen from above in a state where the cell stack is not shown.

In the cover member 18, projections 19 having a generally triangular sectional shape are formed. In the embodiment, an example is shown in which two projections 19 are formed in the section along the width direction Y. As shown in FIG. 4, the projections 19 are formed so as to extend along the length direction X. By forming the projections 19, rigidity of the cover member 18 increases, thereby making it possible to restrain warping in the length direction X. By pressing the heater 16 from above by using such a cover member 18, it is possible to prevent the heater 16 and the cover member 18 from being in contact with the cell bottom part 5. The number and shape of the projections 19 formed in the cover member 18 may be changed as appropriate as long as the projection 19 performs a function of preventing warping with respect to the length direction X. When warping does not happen, the projections 19 of the cover member 18 may be omitted.

In some embodiments, the resin materials of the cover member 18 and the base member 20 explained above have a high emissivity. The "high emissivity" herein means an emissivity of, for example, 0.9~1 (maximum value). Polycarbonate explained as an example of the resin material of the base member 20 and the cover member 18 is also suitable in this regard because it is a high emissivity resin material. Thus, when the base member 20 and the cover member 18 made from a high emissivity resin material are heated by the heater 16, radiant heat is able to heat the cell bottom part 5 that faces the base member 20 and the cover member 18 through the space S, thereby contributing to an efficient increase of temperature of the cell stack 12. However, only either one of the base member 20 and the cover member 18 may be made from a high emissivity resin material. In some embodiments, only the cover member 18 is arranged on the upper side of the heater 16 is made from a high emissivity resin material.

Figure 5:
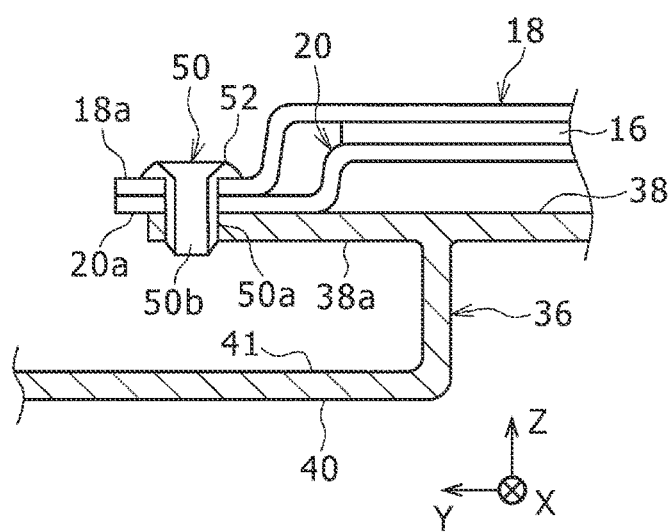
FIG. 5 is an enlarged view showing how to fix the cover member and a base member, which sandwich the heater, by using a resin clip.

FIG. 5 is an enlarged view of how to fix the cover member 18 and the base member 20 by using a resin clip 50, the cover member 18 and the base member 20 sandwiching the heater 16. As shown in FIG. 5, end edge parts 18a, 20a of the cover member 18 and the base member 20 in the width direction Y are fixed by the resin clip 50 onto the base part 38 of the heater installing member 36 in a state of being placed one over the other. The resin clip 50 has an outer cylinder part 50a and an inner shaft part 50b. In the end edge parts of the cover member 18, the base member 20, and the base part 38 in the width direction Y, insertion holes are formed, respectively, in which the resin clip 50 is inserted. The cover member 18 and the base member 20 are mounted on the base part 38 in a state where these insertion holes are aligned with each other, and the outer cylinder part 50a of the resin clip 50 is inserted in the insertion holes. Thereafter, the inner shaft part 50b is inserted from above into a center hole of the outer cylinder part 50a. Thus, an outer diameter of the outer cylinder part 50*a* becomes slightly bigger, and an outer peripheral surface of the outer cylinder part 50*a* is pressed against an inner peripheral part of the insertion hole of the base part 38. As a result, the resin clip 50 is not removed from the base part 38 so easily, and the cover member 18 and the base member 20 are pressed against the base part 38 by a head part 52 of the resin clip 50 and fixed. Thus, the heater 16 is fixed to the base part 38 of the heater installing member 36 in a state of being sandwiched between the cover member 18 and the base member 20.

As stated above, in the embodiment, the heater 16 is fixed to the heater installing member 36 by using the resin clip 50. If metallic bolts or screws are used for fixing the heater 16, heat transferred from the heater 16 to the cover member 18 and the base member 20 is easily transferred to the heater installing member 36 through the metallic bolts and so on. Meanwhile, in the embodiment, since the resin clip 50 having lower thermal conductivity than that of metallic bolts and so on is used, it is possible to restrain heat transfer from the heater 16 to the heater installing member 36, and thus to the housing case 14. This contributes to an efficient temperature increase of the cell stack 12 by using the heater 16.

With reference to FIG. 3 again, in the heater installing member 36, an upper surface of the bottom plate part 40 is positioned lower than an upper surface of the base part 38 on which the heater 16 is installed. Therefore, water produced by condensation inside the recessed-shaped heater installing part 34 tends to be accumulated on top of the bottom plate part 40. When the battery pack 10 is mounted on a vehicle, the battery pack 10 is mounted in a slightly inclined state in the length direction X. Therefore, a space defined and formed by the upper surface 41 (see FIG. 5) of the bottom plate part 40 and a vertical wall part 46*a* formed in an end part of the elastic body 46 serves as a drainage. Thus, water flows along the upper surface of the bottom plate part 40 and is discharged from an end part of the battery pack 10 in the length direction X. Since water tends to be accumulated on the upper surface of the bottom plate part 40, water hardly touches the heater 16, thereby restraining an influence by contact between the heater 16 and water.

Explained next is an effect of temperature increase of the cell stack 12 in the battery pack 10 having the foregoing configuration.

When temperature of the cell stack 12 detected by a temperature sensor (not shown) and so on is lower than a given value, the heater 16 is energized and temperature of the cell stack 12 is increased. To be in more detail, air heated by the heater 16 ascends as shown by wavy arrows in FIG. 3, and comes into contact with the cell bottom part 5 of the battery cell 2 that structures the cell stack 12. Thus, the battery cell 2 is heated and its temperature increases. The space S formed between the heater 16 and the cell bottom part 5 is formed as a closed space in a section in a direction orthogonal to the array direction X of the battery cell 2. Therefore, convection of air heated by the heater 16 happens, while allowing no air to escape from the space S. Therefore, air at relatively low temperature is not drawn into the space S from outside the battery pack 10, and it is thus possible to increase temperature of each of the battery cells 2, or the cell stack 12 efficiently by using the heater 16. In other words, since air heated by the heater 16 does not go around to side parts and upper parts of the cell stack 12, it is possible to heat only the battery cells 2 that structure the cell stack 12 and thus efficiently increase temperature of the battery cells 2.

In the battery pack 10 in the embodiment, the heater 16 is arranged inside the housing case 14 so as to be separated from the cell bottom part 5 of the battery cell 2 vertically downwardly. If the heater 16 is arranged to be in contact with the cell bottom part 5, when the heater 16 is heated abnormally because of some reasons (for example, partial disconnection of a heater wire, an increase in contact resistance of a terminal part, and so on), the battery cell 2 in contact with the abnormally-heated portion falls into an overheated state, thereby causing a safety issue. On the other hand, in the battery pack 10 according to the embodiment, since the heater 16 is arranged so as to face the cell bottom part 5 of the battery cell 2 through the space S, the above-mentioned overheat state of the battery cell does not occur and safety is thus high.

The heater 16 is arranged on top of the case bottom part 26 through the base member 20 serving as the heat insulation means so that the heater 16 is not in contact with the housing case 14 (to be in more detail, the heater installing member 36 that structures a part of the case bottom part 26). Therefore, it is possible to restrain heat transfer from the heater 16 to the housing case 14. Because of this, heat generated by the heater 16 is used effectively in order to increase temperature of the battery cells 2 of the cell stack, and is able to efficiently increase temperature of the cell stacks 12 by being combined with heat by the foregoing convected heat.

The present disclosure is not limited to the configurations of the aforementioned embodiment and its modifications, and it is obvious that various changes and improvements may be made within the matters stated in the scope of claims of the application and its equivalent scope.

What is claimed is:

1. A battery pack comprising:
   a cell stack including a plurality of battery cells arrayed in one direction;
   a housing case housing the cell stack; and
   a heater configured to increase temperature of the battery cells, wherein
   the heater being arranged on top of a bottom part of the housing case inside the housing case such that the heater is separated from a cell bottom part of the battery cell vertically downwardly,
   a space between the bottom part of the housing case and the cell bottom part of the battery cell being a closed space in a section in a direction orthogonal to an array direction of the plurality of battery cells,
   a recessed heater installing part is provided in the bottom part of the housing case, the recessed heater installing part includes a heater installing member that includes a base part on which the heater is arranged and a pair of bottom plate parts extending from a lower surface on both sides of the base part in a direction parallel to the array direction of the battery cells, and upper surfaces of the bottom plate parts facing the closed space are positioned lower than an upper surface of the base part on which the heater is arranged,
   in the section in the direction orthogonal to the array direction of the battery cells, stack support parts on both sides of the recessed heater installing part support the cell stack in a state of being in contact with the cell bottom part of the battery cell such that the closed space is defined, and
   an elastic body is interposed in a contact part between the stack support part and the cell bottom part.

2. The battery pack according to claim 1, wherein the heater is arranged on the upper surface of the base part through a thermal insulation member such that the heater is not to be in contact with the housing case.

3. The battery pack according to claim 2, wherein the thermal insulation member is an insulating resin sheet including a projection configured to define an air layer.

* * * * *